United States Patent
Mueller et al.

(10) Patent No.: US 7,867,971 B2
(45) Date of Patent: Jan. 11, 2011

(54) USE OF POLYMERS CONTAINING POLYVINYLAMINE AND POLYVINYLAMIDE IN ORDER TO PREVENT SMELL IN DISHWASHERS

(75) Inventors: Bettina Mueller, Mannheim (DE); Marcus Guzmann, Muehlhausen (DE); Heike Becker, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 408 days.

(21) Appl. No.: 10/571,922

(22) PCT Filed: Sep. 9, 2004

(86) PCT No.: PCT/EP2004/010055
§ 371 (c)(1),
(2), (4) Date: Mar. 15, 2006

(87) PCT Pub. No.: WO2005/026220
PCT Pub. Date: Mar. 24, 2005

(65) Prior Publication Data
US 2007/0082835 A1   Apr. 12, 2007

(30) Foreign Application Priority Data
Sep. 15, 2003 (DE) .................. 103 42 862

(51) Int. Cl.
*C11D 3/39* (2006.01)
*C11D 3/37* (2006.01)

(52) U.S. Cl. ............... 510/513; 510/514; 510/440; 510/441

(58) Field of Classification Search ............ 510/513, 510/514, 440, 441
See application file for complete search history.

(56) References Cited

U.S. PATENT DOCUMENTS

| | | | | |
|---|---|---|---|---|
| 4,623,699 A * | 11/1986 | Brunnmueller et al. | ..... | 525/355 |
| 4,892,719 A * | 1/1990 | Gesser | ..... | 423/245.1 |
| 5,318,719 A * | 6/1994 | Hughes et al. | ..... | 8/137 |
| 5,373,076 A * | 12/1994 | Pinschmide et al. | ..... | 526/303.1 |
| 5,599,898 A * | 2/1997 | Hartmann et al. | ..... | 528/310 |
| 5,702,613 A * | 12/1997 | Sommese et al. | ..... | 210/708 |
| 5,753,759 A * | 5/1998 | Hartmann et al. | ..... | 525/218 |
| 5,830,844 A * | 11/1998 | Detering et al. | ..... | 510/475 |
| 5,965,651 A * | 10/1999 | Ishii et al. | ..... | 524/388 |
| 6,172,028 B1 * | 1/2001 | Baur et al. | ..... | 510/361 |
| 6,231,879 B1 * | 5/2001 | Li et al. | ..... | 424/422 |
| 6,239,091 B1 * | 5/2001 | Tartakovsky et al. | ..... | 510/220 |
| 6,287,585 B1 | 9/2001 | Johansen | | |
| 2003/0032574 A1 * | 2/2003 | Meffert et al. | ..... | 510/466 |
| 2003/0125491 A1 * | 7/2003 | Meffert et al. | ..... | 526/264 |
| 2003/0158076 A1 * | 8/2003 | Rodrigues | ..... | 510/475 |
| 2005/0032667 A1 * | 2/2005 | Norenberg et al. | ..... | 510/480 |

FOREIGN PATENT DOCUMENTS

| | | |
|---|---|---|
| DE | 100 07 196 | 9/2001 |
| DE | 101 60 993 | 6/2003 |
| DE | 10160993 A1 * | 6/2003 |
| EP | 0 794 053 | 9/1997 |
| EP | 0 938 862 A2 * | 9/1999 |
| EP | 1 213 344 | 6/2002 |
| JP | 09-040717 | 2/1997 |
| JP | 09-201405 | 8/1997 |
| JP | 2000-119513 | 4/2000 |
| JP | 2000-312809 | 11/2000 |
| WO | 00/66187 | 11/2000 |
| WO | WO 01/66612 A1 * | 9/2001 |
| WO | WO 01/68727 A1 * | 9/2001 |

OTHER PUBLICATIONS

Derwent English language abstract of EP 0 938 862 A2, Sep. 1999, Stetter, (patent in German).*

* cited by examiner

*Primary Examiner*—Mark Eashoo
*Assistant Examiner*—Jane L Stanley
(74) *Attorney, Agent, or Firm*—Oblon, Spivak, McClelland, Maier & Neustadt, L.L.P.

(57) ABSTRACT

Use of polymers which comprise
(a) monomer units of the formula I

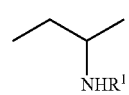

in which $R^1$ is hydrogen or $C_1$-$C_4$-alkyl,
(b) monomer units of the formula II

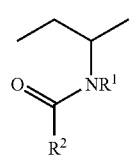

in which $R^1$ and $R^2$, independently of one another, are hydrogen or $C_1$-$C_4$-alkyl,
or
(c) monomer units of the formula I and monomer units of the formula II, for odor prevention during machine dishwashing.

21 Claims, No Drawings

USE OF POLYMERS CONTAINING POLYVINYLAMINE AND POLYVINYLAMIDE IN ORDER TO PREVENT SMELL IN DISHWASHERS

The present invention relates to the use of polymers which comprise
(a) monomer units of the formula I

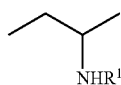

in which $R^1$ is hydrogen or $C_1$-$C_4$-alkyl,
(b) monomer units of the formula II

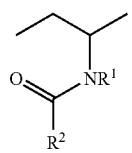

in which $R^1$ and $R^2$, independently of one another, are hydrogen or $C_1$-$C_4$-alkyl,
or
(c) monomer units of the formula I and monomer units of the formula II, for odor prevention during machine dishwashing.

In addition, the invention relates to detergents and rinse aids for machine dishwashing which comprise these copolymers as odor-preventing additive.

If a dishwasher is not used for a prolonged period, unpleasant odors arise which are caused on the one hand by soiled dishes in the machine, and on the other hand by contaminated water from the last wash cycle.

To avoid this odor nuisance, so-called dishwasher deodorants are used which release perfume and thus conceal the bad odors, or comprise special perfume components or active ingredients which capture the odor molecules by means of a chemical reaction in the air.

The control of unpleasant odors also plays a large role in other areas of application.

For example, WO-A-00/66187 describes superabsorbent polymers which comprise odor-control compounds for reducing or avoiding ammonia odor for use in diapers, bandages, sanitary napkins and disposable paper products. The superabsorbent polymers mentioned are, inter alia polyvinylamines, although only crosslinked polyacrylic acids are explicitly disclosed which are used in combination with cyclodextrin, calcium phosphates, amphoteric surface-active agents and triclosan as odor-control components.

JP-A-09-040717 describes liquid-absorbent polymeric materials, present in gel form, based on N-vinylcarbonamides, preferably N-vinylacetamide and N-methyl-N-vinylacetamide, and if appropriate other copolymerizable ethylenically unsaturated monomers. For these materials, a large number of applications is listed, the absorption and/or control of moisture being at the forefront, and the use for the purpose of deodorization being mentioned only in passing.

In addition, JP-A-2000-119513 discloses transparent gel compositions which comprise polyvinylcarbonamides, water and an acid, and are proposed as deodorant for alkaline odorants in living spaces, bathrooms and vehicles.

To reduce the indoor air concentration of aldehydes, primarily formaldehyde, and acidic acids, such as sulfur dioxide and sulfur trioxide, nitrogen oxides and hydrogen sulfide, U.S. Pat. No. 4,892,719 describes indoor air filters based on porous supports which are coated with a combination of a water-soluble polymeric amine and a water-soluble, readily volatile, liquid plasticizer. The polymeric amines mentioned are, inter alia, also polyvinylamines, although only polyethyleneimines are explicitly disclosed.

JP-A-2000-312809 discloses filters, which can be used in air-conditioning systems, based on porous inorganic support materials to which are bound, as deodorizing agent, inter alia polyvinylamines comprising primary and secondary amino groups by means of a synthetic resin. These filters reportedly have a deodorizing effect against ammonia, tobacco smoke and hydrogen sulfide.

In addition, JP-A-09-201405 describes fine porous particles based on inorganic materials to which a polymer comprising polyvinylamine and polyvinylformamide or polyvinylacetamide units is bound by chelating. These particles reportedly have an odor-removing effect against ammonia, amines, tobacco smoke, hydrogen sulfide, mercaptans and aldehydes.

Finally, EP-A-794 053 describes multilayer packagings for oxygen-sensitive foods and drinks, which have an oxygen barrier layer, an oxygen scavenger and an absorber for oxidation by-products, such as aldehydes. The possible absorbers listed are polyethyleneimines (co)polymers of allylamine, diallylamine, vinylamine and vinylpyridine.

It is an object of the invention to provide polymers with which odor nuisances in dishwashers can be prevented or at least significantly reduced.

We have found that this object is achieved through the use of polymers which comprise
(a) monomer units of the formula I

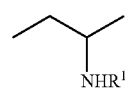

in which $R^1$ is hydrogen or $C_1$-$C_4$-alkyl,
(b) monomer units of the formula II

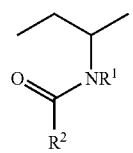

in which $R^1$ and $R^2$, independently of one another, are hydrogen or $C_1$-$C_4$-alkyl,
or
(c) monomer units of the formula I and monomer units of the formula II, for odor prevention during machine dishwashing.

We have also found detergents and rinse aids for machine dishwashing which comprise these polymers as odor-preventing additive.

The polymers to be used according to the invention may be formed only from the monomer units of the formula I or only from the monomer units of the formula II, but preferably comprise both monomer units.

The content of the monomer units I in these particularly suitable polymers is usually 0.1 to 99.9 mol %, and the content of the monomer units II is accordingly likewise 0.1 to 99.9 mol %. Particularly preferred compositions of these polymers are governed by the intended use. For example, for the adsorption of aldehydes, polymers which are as completely hydrolyzed as possible with the highest possible content of monomers I are particularly suitable, and for the adsorption of amines, largely unhydrolyzed polymers with the highest possible content of monomers II are particularly suitable.

The polymers to be used according to the invention and based only on the monomer units I and/or II can be prepared by free-radical polymerization of N-vinylcarboxamides, such as N-vinylformamide, N-vinyl-N-methylformamide, N-vinylacetamide, N-vinyl-N-methylacetamide, N-vinyl-N-ethylformamide, N-vinyl-N-n-propylformamide, N-vinyl-N-isopropylformamide, N-vinyl-N-isobutylformamide, N-vinyl-N-methylacetamide, N-vinyl-N-n-butylacetamide and N-vinyl-N-methylpropionamide, preferably of N-vinylformamide, and preferably subsequent complete or, in particular, partial hydrolysis of the amide functions to amine functions.

The hydrolysis can be carried out under alkaline or acidic conditions, preference being given to working in an aqueous medium and at a temperature of from 70 to 90° C. It is, however, also possible to use inert organic solvents, such as dioxane or aliphatic or aromatic hydrocarbons, or alcohols, e.g. tert-butanol, as reaction medium.

In the case of alkaline hydrolysis, the pH is advantageously from 9 to 14, which is adjusted using an inorganic base, such as an alkali metal and alkaline earth metal hydroxide, e.g. sodium hydroxide and potassium hydroxide, ammonia, or an organic base, such as amines, 0.05 to 1.5 equivalents of base usually being used per amide function.

The acidic hydrolysis is generally carried out at a pH of from 0 to 5, primarily 0 to 3, with an organic acid, such as a carboxylic acid, e.g. formic acid, acetic acid and propionic acid, or a sulfonic acid, e.g. benzenesulfonic acid and toluenesulfonic acid, or preferably an inorganic acid, e.g. hydrochloric acid, hydrobromic acid, sulfuric acid and phosphoric acid, 0.05 to 1.5 equivalents of acid being used per amide function.

Further details relating to the polymers based on monomer units I and/or II, and relating to their preparation can be found in EP-A-71 050.

The polymers to be used according to the invention can additionally comprise, in copolymerized form, a monoethylenically unsaturated comonomer (d). Of course, it is also possible for a plurality of comonomers (d) to be copolymerized. Suitable comonomers (d) are anionic, nonionic and cationic monomers.

Examples of suitable anionic comonomers (d) are:
α,β-unsaturated monocarboxylic acids which preferably have 3 to 6 carbon atoms, such as acrylic acid, methacrylic acid, ethacrylic acid, crotonic acid and vinyl acetic acid, and alkali metal and ammonium salts thereof;
unsaturated dicarboxylic acids which preferably have 4 to 6 carbon atoms, such as itaconic acid and maleic acid, anhydrides thereof, such as maleic anhydride, and alkali metal and ammonium salts thereof;
half-esters of unsaturated dicarboxylic acids with $C_1$-$C_6$-alcohols, such as itaconic and maleic half-esters.

A preferred anionic comonomer (d) is acrylic acid and its salts, primarily sodium acrylate.

Examples of suitable nonionic comonomers (d) are:
esters of monoethylenically unsaturated $C_3$-$C_6$-carboxylic acids, especially of acrylic acid and methacrylic acid, with monohydric $C_1$-$C_{22}$-alcohols, in particular with $C_1$-$C_{16}$-alcohols; and hydroxyalkyl esters of monoethylenically unsaturated $C_3$-$C_6$-carboxylic acids, especially of acrylic acid and methacrylic acid, with dihydric $C_2$-$C_4$-alcohols, such as methyl (meth)acrylate, ethyl (meth)acrylate, n-butyl (meth)-acrylate, sec.-butyl (meth)acrylate, tert.-butyl (meth)acrylate, ethylhexyl (meth)acrylate, hydroxyethyl (meth)acrylate and hydroxypropyl (meth)acrylate;
amides of monoethylenically unsaturated $C_3$-$C_6$-carboxylic acids, especially of acrylic acid and methacrylic acid, with primary and secondary $C_1$-$C_{12}$-amines, such as (meth)acrylamide, N-methyl(meth)acrylamide, N-isopropyl(meth)acrylamide and N-butyl(meth)acrylamide;
vinyl esters of saturated $C_1$-$C_{18}$-carboxylic acids, such as vinyl acetate and vinyl propionate;
aliphatic and aromatic olefins, such as ethylene, propylene, $C_4$-$C_{24}$-α-olefins, in particular $C_4$-$C_{16}$-α-olefins, e.g. butylene, isobutylene, diisobutene, styrene and α-methylstyrene, and also diolefins with an active double bond, e.g. butadiene;
unsaturated alcohols, such as vinyl alcohol and allyl alcohol;
unsaturated nitriles, such as acrylonitrile and methacrylonitrile.

Examples of suitable cationic comonomers (d) are:
N-vinyllactams of lactams with 5- to 7-membered rings, such as N-vinylpyrrolidone, N-vinylcaprolactam and N-vinyloxazolidone;
monomers comprising vinylimidazole and vinylimidazoline units, and alkyl derivatives thereof, in particular $C_1$-$C_5$-alkyl derivatives, and quaternization products thereof, such as N-vinylimidazole, N-vinyl-2-methylimidazole, N-vinyl-4-methylimidazole, N-vinyl-5-methylimidazole, N-vinyl-2-ethylimidazole, N-vinylimidazoline, N-vinyl-2-methylimidazoline and N-vinyl-2-ethylimidazoline;
vinylpyridines and quaternization products thereof, such as 4-vinylpyridine, 2-vinyl-pyridine, N-methyl-4-vinylpyridine and N-methyl-2-vinylpyridine;
basic esters of ethylenically unsaturated carboxylic acids, in particular the esters of α,β-unsaturated $C_3$-$C_6$-monocarboxylic acids, especially of acrylic acid and methacrylic acid, with aminoalcohols, especially N,N-di($C_1$-$C_4$-alkyl)amino-$C_2$-$C_6$-alcohols, and quaternization products thereof, such as dimethylaminoethyl (meth)acrylate, dimethylaminopropyl (meth)acrylate, diethylaminoethyl acrylate, diethylaminopropyl acrylate, dimethylaminobutyl acrylate and diethylaminobutyl acrylate;
basic amides of ethylenically unsaturated carboxylic acids, in particular the N,N-di ($C_1$-$C_4$-alkyl)amino($C_2$-$C_6$-alkyl)amides of α,β-unsaturated $C_3$-$C_6$-monocarboxylic acids, especially of acrylic acid and methacrylic acid, and quaternization products thereof, such as dimethylaminoethyl(meth)acrylamide, diethylaminoethyl-(meth) acrylamide, dimethylaminopropyl(meth)acrylamide and diethylaminopropyl-(meth) acrylamide.

If the polymers to be used according to the invention comprise comonomers (d) in copolymerized form, their content is generally 0.1 to 80 mol %, in particular 10 to 50 mol %, based on the polymer.

Further details relating to these copolymers and to their preparation can be found in WO-A-98/13882.

The polymers to be used according to the invention may be in water-soluble form, but they may also be crosslinked and thus water-insoluble.

The crosslinking can be carried out by thermal treatment of the polymer and/or by reaction with formic acid derivatives, in which case amidines are formed in a targeted manner.

However, the crosslinking preferably takes place by copolymerizing a further crosslinking comonomer (e) which comprises at least two ethylenically unsaturated, nonconjugated double bonds.

Examples of suitable crosslinkers (e) are:
alkylenebisacrylamides, such as methylenebisacrylamide and N,N'-acryloylethylene diamine;
divinylalkyleneureas, such as N,N'-divinylethyleneurea and N,N'-divinylpropyleneura;
ethylidenebis-3-(N-vinylpyrrolidone), N,N'-divinyldiimidazolyl-(2,2')-butane and 1,1'-bis-(3,3'-vinylbenzimidazolith-2-one) 1,4-butane;
alkylene glycol di(meth)acrylates, such as ethylene glycol di(meth)acrylate, diethylene glycol di(meth)acrylate and tetraethylene glycol di(meth)acrylate;
aromatic divinyl compounds, such as divinylbenzene and divinyltoluene;
vinyl acrylate, allyl (meth)acrylate, triallylamine, divinyldioxane and pentaerythritol triallyl ether.

Crosslinked polymers to be used according to the invention generally comprise 20 to 99.9 mol % of the monomer units (a), (b) or (c), 0 to 80 mol % of the comonomer (d) and 0.1 to 20 mol % of the comonomer (e) in copolymerized form.

If the crosslinked polymers comprise no comonomer (d), then their composition is preferably 80 to 99.9 mol % of monomer units (a), (b) or (c) and 0.1 to 20 mol % of comonomer (e).

If a comonomer (d) is present in the crosslinked polymers, then they have a preferred content of from 20 to 99.9 monomer units (a), (b) or (c), 0.1 to 80 mol % of the comonomer (d) and 0.1 to 20 mol % of the comonomer (e).

Finally, the polymers to be used according to the invention and comprising comonomers (e) and if desired (d) can also be in the form of a popcorn polymer. Such polymers and processes for their preparation are described in DE-A-42 37 439.

The polymers to be used according to the invention generally have average molecular weights $M_w$, of from 1000 to 6 000 000 g/mol, preferably 45 000 to 450 000 g/mol.

Their K values are usually 10 to 250, preferably 45 to 90 (measured in 0.5% strength by weight aqueous solution at 25° C., in accordance with H. Fikentscher, Cellulose-Chemie, Volume 13, pages 58-64 and 71-74 (1932)).

The polymers to be used according to the invention are exceptionally suitable for odor prevention during machine dishwashing.

In this connection, they may be added either to the rinse aid or to the detergent, or else are introduced separately into the dishwasher in the form of a solid.

Their deodorizing effect is at its greatest when they are released in the clear-rinse cycle and some remain in the machine's sump. Firstly, odor components which remain after the main wash cycle are bound before the dishwasher is opened. Secondly, residues of the rinse aid remain in the machine's sump such that the odor nuisance caused by food residues which adhere to soiled dishes and dishes sitting in the machine until the next wash cycle is also removed.

The polymers to be used according to the invention can be used in different ways.

For example, they are advantageously used in dissolved form in the rinse aid.

If they are used in the dishwashing detergent formulation, then it is advisable to delay and/or to control their release so that they can also act in and after the clear-rinse cycle. This may be achieved, for example, by coating with a material which is not soluble before the conditions of the clear-rinse cycle (temperature, pH), or the incorporation into a matrix of such a material, it being possible for them to be used in this form also in the rinse aid or else as a separate formulation. Suitable coating or matrix materials are, for example, polyvinyl alcohol prepared by incomplete hydrolysis of polyvinyl acetate (degree of hydrolysis of usually from 88 to 98%, preferably 89 to 95%, particularly preferably 91 to 92%), gelatin, polyvinylpyrrolidone, polyethylene oxide, cellulose and derivatives thereof, starch and derivatives thereof and mixtures of these materials.

Suitable for use over a prolonged period of use are, in particular, polymers to be used according to the invention in the form of a popcorn polymer which, for example in a basket or a net, is introduced into the dishwasher and remains in the machine even during the wash cycles or is removed in the meantime. Finally, the polymers to be used according to the invention could, for this purpose, also be irreversibly applied to a suitable support material.

EXAMPLES

I) Preparation of Polymers

Polymer 1

At an internal temperature of 78° C. and 380 mbar, 20.2 g of vinylformamide (99% strength) and a solution of 0.1 g of 2,2'-azobis(2-methylpropionamidine) dihydrochloride in 4.9 g of water were slowly metered in separately to 100 g of phosphate-buffered demineralized water (pH 6-7). After complete polymerization for 2.5 hours at 80° C. and distilling off 25 g of water, the conversion was 98%.

A viscous polymer solution with a solids content of 20% by weight was obtained. The K value of the polymer was 90 (0.5% strength by weight in water, 25° C.).

Polymer 1a

A mixture of 100 g of a solution of polymer 1 obtained as described above and 1.25 g of a 40% strength by weight aqueous sodium hydrogensulfite solution was heated to 80° C. 48.44 g of a 25% strength by weight sodium hydroxide solution were then added. After stirring for 4 hours at 80° C. and cooling to 40° C., 21 g of a 38% strength by weight hydrochloric acid were added for neutralization.

A polymer solution with a solids content of 22.0% by weight and a viscosity of 560 mPas (Brookfield spindle 3/50 rpm/RT) was obtained. The degree of hydrolysis of the polymer was 89% (measured by means of polyelectrolyte titration).

Polymer 1b

The procedure was analogous to polymer 1a, but 22.5 g of sodium hydroxide solution and 10.1 g of hydrochloric acid were used.

A polymer solution with a solids content of 18.9% by weight and a viscosity of 1080 mPas (Brookfield spindle 4/100 rpm/RT) was obtained. The degree of hydrolysis of the polymer was 50% (measured by means of polyelektrolyte titration).

Polymer 2

At an internal temperature of 80° C. and 450 mbar, 24.5 g of vinylformamide (99% strength) and a solution of 0.41 g of 2,2'-azobis(2-methylpropionamidine) dihydrochloride in 4.9 g of water were slowly metered in separately to 115 g of phosphate-buffered demineralized water (pH 6-7). After complete polymerization for 5.5 hours at 80° C. and distilling off 31 g of water, the conversion was 98%.

A polymer solution with a solids content of 22.5% by weight and a viscosity of 336 mPas (Brookfield spindle 2/50 rpm/RT) was obtained. The K value of the polymer was 47 (1% strength by weight in water, 25° C.).

Polymer 2a

A mixture of 81 g of a solution of polymer 2 obtained as described above and 1.05 g of a 40% strength by weight aqueous sodium hydrogensulfite solution was heated to 80° C. 41.7 g of a 25% strength by weight sodium hydroxide solution were then added. After stirring for 4 hours at 80° C. and cooling to 40° C., 17.6 g of a 38% strength by weight hydrochloric acid were added for neutralization.

A polymer solution with a solids content of 23.1% by weight and a viscosity of 86 mPas (Brookfield spindle 2/100 rpm/RT) were obtained. The degree of hydrolysis of the polymer was 90% (measured by means of polyelektrolyte titration).

Polymer 3

A mixture of 800 g of distilled water, 180 g of vinylformamide (99% strength), 20 g of N-vinylpyrrolidone, 4 g of N,N'-divinylethyleneurea and 0.05 g of sodium hydroxide was heated to 60° C. with the introduction of a gentle stream of nitrogen. A solution of 0.4 g of sodium dithionate in 10 g of distilled water was then added all at once. After 15 min, fine flocks appeared which, after further heating for 4 hours at 60° C. and cooling, were filtered off and washed with water.

A popcorn polymer with a solids content of 41.2% by weight was obtained. The yield was 97.8%.

Polymer 3a

A suspension of 100 g of the polymer 3 obtained as described above in 650 g of water was admixed with 60 g of a 38% strength by weight hydrochloric acid and then heated at 90° C. for 12 h with vigorous stirring, the progress of the hydrolysis being controlled by enzymatic analysis of the released formate. After cooling to room temperature, the polymer was filtered off, washed with water and dried in a vacuum drying cabinet at 70° C.

50 g of polymer with a solids content of 95% and a degree of hydrolysis of 79% (determined by enzymatic analysis of the released formate) were obtained.

Polymer 3b

A suspension of 100 g of the polymer 3 obtained as described above in 650 g of water was admixed with 40 g of a 50% strength by weight sodium hydroxide solution and then heated at 80° C. for 15 h with vigorous stirring, the progress of the hydrolysis being controlled by enzymatic analysis of the released formate. After cooling to room temperature, the polymer was filtered off, washed with water and dried in a vacuum drying cabinet at 70° C.

33 g of polymer with a solids content of 91% and a degree of hydrolysis of 82% (determined by enzymatic analysis of the released formate) were obtained.

Polymer 4

At 80° C. and with the introduction of nitrogen, a solution of 2.7 g of 2,2'-azobis(2-methylpropionamide) dihydrochloride in 51.3 g of water, 211.1 g of vinylformamide and 317.5 g of a 37.3% strength by weight aqueous solution of sodium acrylate was slowly metered in separately to 908.3 g of phosphate-buffered demineralized water (pH 6-7). After complete polymerization for 6 hours at 80° C., the conversion was 90%.

A viscous polymer solution with a solids content of 25.8% by weight was obtained. The K value of the polymer was 87.4 (0.5% strength by weight in water, 25° C.).

Polymer 4a

A mixture of 159.8 g of a solution of polymer 4 obtained as described above and 2.0 g of a 40% strength by weight aqueous sodium hydrogensulfite solution was heated to 80° C. 41.0 g of a 25% strength by weight sodium hydroxide solution were then added.

After stirring for 4 hours at 80° C. and cooling to 40° C., 22 g of a 37% strength by weight hydrochloric acid were added for neutralization.

A polymer solution with a solids content of 7% by weight was obtained. The degree of hydrolysis of the polymer were 67.7% (determined by enzymatic analysis of the released formate).

II) Testing the Prepared Polymers

Example 1

To assess the effectiveness of polymer 2a as odor preventer in a dishwasher loaded with soiled dishes, the procedure was as follows:

Prior to the experiment, 2 dishwashers (Miele G 686 SC; test and reference dishwasher) were in each case precleaned by a wash cycle with citric acid.

Then, in successive experiments, varying amounts

A: 300 mg
B: 750 mg
C: 1500 mg of the resulting aqueous solution of polymer 2a were placed on a watchglass, and 20 g of IKW ballast soiling (SÖFW-Journal, $124^{th}$ volume, 14/98, p. 1029) were placed on a further watchglass in the test dishwasher. In the reference dishwasher, only 20 g of the IKW ballast soiling were put there in each case.

Both dishwashers were closed and left to stand for 2 days. The odor in the inside of the test dishwasher was then assessed compared to that in the reference dishwasher by 11 subjects using the following scale of grades:

Grade 1: significantly more pleasant than reference
Grade 2: more pleasant than reference
Grade 3: no difference
Grade 4: more unpleasant than reference
Grade 5: significantly more unpleasant than reference The results obtained are listed in table 1.

TABLE 1

| | Grades awarded | | |
|---|---|---|---|
| Grade | A | B | C |
| 1 | | 1 | 2 |
| 2 | 3 | 7 | 8 |
| 3 | 8 | 3 | .1 |
| 4 | | | |
| 5 | | | |
| Average | 2.5 | 2.2 | 1.9 |

Example 2

To assess the effectiveness of polymer 2a as odor preventer upon use in a rinse aid, the procedure was as follows:

Prior to the experiment, 2 dishwashers (test and reference dishwasher) were in each case precleaned by a wash cycle with citric acid.

Then, after loading both dishwashers with ballast soiling, washing was carried out under the following conditions:

| | |
|---|---|
| Dishwasher: | Miele G 686 SC |
| Wash cycles: | 1 wash cycle 55° C. normal (without prewash) |
| Ware: | without |
| Dishwasher detergent: | 21 g (mixture without perfume) |
| Clear-rinse temperature: | 65° C. |
| Water hardness: | 14° German hardness |
| IKW ballast soiling: | 50 g in the main wash cycle, 2 g in the clear-rinse cycle |

The wash cycles were in each case interrupted prior to the start of the clear-rinse cycle. In addition to the 2 g of ballast soiling, varying amounts A: 300 mg
B: 750 mg
C: 1500 mg of the resulting aqueous solution of polymer 2a were added to the test dishwasher in successive experiments.

After the clear-rinse cycle was complete and after waiting for 30 minutes, the odor was assessed as in example 1 after opening the dishwashers.

The results obtained are listed in table 2.

TABLE 2

| | Grades awarded | | |
|---|---|---|---|
| Grade | A | B | C |
| 1 | | | 2 |
| 2 | 2 | 6 | 6 |
| 3 | 9 | 5 | 2 |
| 4 | | | |
| 5 | | | |
| Average | 2.8 | 2.5 | 2.2 |

After a further 2 hours, the odor in the dishwashers was evaluated again.

The results obtained are listed in table 3.

TABLE 3

| | Grades awarded | | |
|---|---|---|---|
| Grade | A | B | C |
| 1 | | 2 | 3 |
| 2 | 3 | 7 | 8 |
| 3 | 8 | 2 | |
| 4 | | | |
| 5 | | | |
| Average | 2.7 | 2.0 | 1.7 |

Example 3

To assess the effectiveness of polymer 3a as odor preventer when added in the clear-rinse cycle, the procedure was analogous to that in example 2, except that instead of the polymer solution, varying amounts D: 250 mg
E: 500 mg of popcorn polymer were put, in a mesh basket, onto the lower dish rack of the test dishwasher in successive experiments.

The results obtained in this assessment are listed in table 4.

TABLE 4

| | Grades awarded | |
|---|---|---|
| Grade | D | E |
| 1 | | |
| 2 | 2 | 5 |
| 3 | 9 | 6 |
| 4 | | |
| 5 | | |
| Average | 2.8 | 2.6 |

Example 4

The ability of the prepared polymers to adsorb triethylamine was tested as follows:

36.6 mg (about 1860 ppm v/v) of triethylamine were in each case initially introduced into a gas-tight 10 l glass vessel. Using a mini gas chromatograph (Varian CP 4900), gas samples were taken at intervals of 10 minutes and analyzed.

Following stabilization of the triethylamine starting concentration (after about 50 min), 0.6 ml of polymer solution or 200 mg of popcorn polymer were introduced into the glass vessel.

After 240 min, the decrease in the triethylamine concentration in the gas space was determined. The reference used in the case of the polymer solutions was pure water. The experimental results summarized in table 5 give the percentage adsorption of tri-ethylamine on the polymer and have been corrected by this reference value.

TABLE 5

| Polymer | Adsorption of triethylamine |
|---|---|
| 1b | 3.2% |
| 2a | 28.4% |
| 3 | 34.0% |
| 3a | 79.1% |

Example 5

The ability of the prepared polymers to adsorb hexanal was tested analogously to example 4.

Instead of triethylamine, 36.2 mg (about 1 950 ppm v/v) of hexanal were now initially introduced.

The experimental results listed in table 6 give the percentage adsorption of hexanal to the polymer and have been corrected, as above, by the water reference value.

TABLE 6

| Polymer | Adsorption of hexanal |
|---|---|
| 1a | 8.8% |
| 1b | 15.6% |
| 2a | 21.3% |
| 3 | 6.7% |
| 3a | 9.0% |
| 4a | 30.0% |

We claim:

1. A composition comprising a material selected from the group consisting of polyvinyl alcohol prepared by incomplete hydrolysis of polyvinyl acetate comprising a degree of hydrolysis of from 88 to 98%, gelatin, polyvinylpyrrolidone, polyethylene oxide, cellulose, starch, and mixtures thereof; and a neutral polymer which comprises (a) units of the formula I

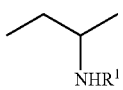

I wherein $R^1$ is hydrogen or $C_1$-$C_4$-alkyl,
or
(c) units of the formula I and units of the formula II

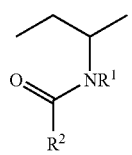

II wherein $R^1$ and $R^2$, independently of one another, are hydrogen or $C_1$-$C_4$-alkyl.

2. The composition of claim 1, wherein the neutral polymer comprises 0.1 to 99.9 mol % of the units of the formula I and 0.1 to 99.9 mol % of the units of the formula II.

3. The composition of claim 1, wherein the neutral polymer additionally comprises, in copolymerized form, a monoethylenically unsaturated comonomer (d).

4. The composition of claim 1, wherein the neutral polymer is coated with the material.

5. The composition of claim 1, wherein the neutral polymer is embedded in a matrix of the material.

6. The composition of claim 3, wherein the neutral polymer comprises, in copolymerized form, 20 to 99.9 mol % of the units (a) or (c) and 0.1 to 80 mol % of the comonomer (d).

7. The composition of claim 6, wherein the neutral polymer is crosslinked.

8. The composition of claim 7, wherein the neutral polymer additionally comprises, in co-polymerized form, a crosslinking comonomer (e) comprising at least two ethylenically unsaturated double bonds, wherein the at least two ethylenically unsaturated double bonds are not conjugated to each other.

9. The composition of claim 7, wherein the neutral polymer is present in the form of a popcorn polymer.

10. The composition of claim 8, wherein the neutral polymer is present in the form of a popcorn polymer.

11. The composition of claim 8, wherein the neutral polymer comprises, in copolymerized form, 20 to 99.9 mol % of the units (a) or (c), 0.1 to 80 mol % of the comonomer (d) and 0.1 to 20 mol % of the comonomer (e).

12. The composition of claim 11, wherein the neutral polymer is present in the form of a popcorn polymer.

13. A method of preventing or reducing odor during dishwashing in a dishwashing machine, comprising placing the composition of claim 1 in the dishwashing machine to prevent or reduce the odor.

14. A method of preventing or reducing odor during dishwashing in a dishwashing machine, comprising placing the composition of claim 2 in the dishwashing machine to prevent or reduce the odor.

15. A method of preventing or reducing odor during dishwashing in a dishwashing machine, comprising placing the composition of claim 3 in the dishwashing machine to prevent or reduce the odor.

16. A method of preventing or reducing odor during dishwashing in a dishwashing machine, comprising placing the composition of claim 6 in the dishwashing machine to prevent or reduce the odor.

17. A method of preventing or reducing odor during dishwashing in a dishwashing machine, comprising placing the composition of claim 4 in the dishwashing machine to prevent or reduce the odor.

18. A method of preventing or reducing odor during dishwashing in a dishwashing machine, comprising placing the composition of claim 5 in the dishwashing machine to prevent or reduce the odor.

19. A method of preventing or reducing odor during dishwashing in a dishwashing machine, which comprises placing in the dishwashing machine a composition comprising (1) a material selected from the group consisting of polyvinyl alcohol prepared by incomplete hydrolysis of polyvinyl acetate comprising a degree of hydrolysis of from 88 to 98%, gelatin, polyvinylpyrrolidone, polyethylene oxide, cellulose, starch, and mixtures thereof; and (2) a neutral polymer which comprises (a) units of the formula I

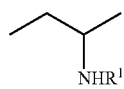

I wherein $R^1$ is hydrogen or $C_1$-$C_4$-alkyl,
or
(c) units of the formula I and units of the formula II

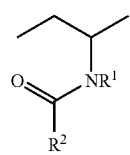

II wherein $R^1$ and $R^2$, independently of one another, are hydrogen or $C_1$-$C_4$-alkyl.

20. A composition comprising a material selected from the group consisting of polyvinyl alcohol prepared by incomplete hydrolysis of polyvinyl acetate comprising a degree of hydrolysis of from 88 to 98%, gelatin, polyvinylpyrrolidone, polyethylene oxide, cellulose, starch, and mixtures thereof; and a neutral polymer which comprises (a) units of the formula I

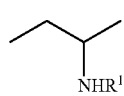

I wherein $R^1$ is hydrogen or $C_1$-$C_4$-alkyl, or
(c) units of the formula I and units of the formula II
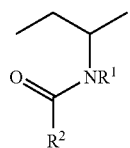
II
wherein $R^1$ and $R^2$, independently of one another, are hydrogen or $C_1$-$C_4$-alkyl;
wherein said neutral polymer is present in the composition in the form of a popcorn polymer.
21. The composition of claim 20, wherein the neutral polymer is crosslinked and present in the composition in the form of a popcorn polymer.
* * * * *